US010757137B1

(12) United States Patent
Roturier et al.

(10) Patent No.: US 10,757,137 B1
(45) Date of Patent: Aug. 25, 2020

(54) THWARTING AN IMPERSONATION ATTACK USING ONLINE DECOY TEXT

(71) Applicant: SYMANTEC CORPORATION, Mountain View, CA (US)

(72) Inventors: Johann Roturier, Maynooth (IE); David Luz Silva, Swords (IE); Pratyush Banerjee, Dublin (IE)

(73) Assignee: NortonLifeLock Inc., Tempe, AZ (US)

( * ) Notice: Subject to any disclaimer, the term of this patent is extended or adjusted under 35 U.S.C. 154(b) by 155 days.

(21) Appl. No.: 16/143,077

(22) Filed: Sep. 26, 2018

(51) Int. Cl.
*H04L 29/06* (2006.01)
*G06N 20/00* (2019.01)

(52) U.S. Cl.
CPC ......... *H04L 63/1491* (2013.01); *G06N 20/00* (2019.01); *H04L 63/1483* (2013.01)

(58) Field of Classification Search
CPC .................................................. H04L 63/1491
See application file for complete search history.

(56) References Cited

U.S. PATENT DOCUMENTS

| | | | | |
|---|---|---|---|---|
| 9,361,457 B1* | 6/2016 | Ramalingam | ............ | G06F 21/56 |
| 9,413,782 B1* | 8/2016 | Adams | ................ | H04L 63/1416 |
| 9,654,288 B1* | 5/2017 | Howell | ................ | H04L 9/0866 |
| 10,305,707 B1* | 5/2019 | Stein | ........................ | H03M 1/00 |
| 2003/0195852 A1* | 10/2003 | Campbell | ................ | G06F 21/10 |
| | | | | 705/51 |
| 2011/0179487 A1* | 7/2011 | Lee | ...................... | H04L 63/1491 |
| | | | | 726/23 |
| 2014/0310805 A1* | 10/2014 | Kandekar | ............. | H04L 63/083 |
| | | | | 726/19 |
| 2017/0104785 A1* | 4/2017 | Stolfo | ..................... | G06N 20/00 |
| 2018/0146002 A1* | 5/2018 | Canfield | .............. | H04L 63/1433 |
| 2019/0190952 A1* | 6/2019 | Cherry | ................ | H04L 63/1491 |

OTHER PUBLICATIONS

Github; "psal/ananymouth"; 2018; web page located at: https://github.com/psal/anonymouth; accessed on Sep. 26, 2018; 6 pages.
Trend Micro Incorporated; "Trend Micro Unveils Industry's First AI-Powers Writing Style Analysis to Halt Email Fraud"; 2018; web page located at: https://newsroom.trendmicro.com/press-release/commercial/trend-micro-unveils-industrys-first-ai-powered-writing-style-analysis-halt-; accessed on Sep. 26, 2018; 1 page.
Endgame; "Artemis: An Intelligent Assistant for Cyber Defense"; 2018; web page located at: https://www.endgame.com/blog/technical-blog/artemis-intelligent-assistant-cyber-defense; accessed on Sep. 26, 2018; 3 pages.

* cited by examiner

*Primary Examiner* — Simon P Kanaan
(74) *Attorney, Agent, or Firm* — Maschoff Brennan

(57) ABSTRACT

Thwarting an impersonation attack using online decoy text. In one embodiment, a method may include intercepting first actual text submitted online by a first user, generating decoy text to replace the first actual text, sending the decoy text for posting online, training a machine learning model using the decoy text to make the machine learning model capable of recognizing a decoy language pattern in the decoy text, intercepting second actual text submitted to a web server by a second user purporting to be the first user, determining, using the machine learning model, that a language pattern in the second actual text matches the decoy language pattern in the decoy text, and, in response, determining that the second user is impersonating the first user in an impersonation attack and thwarting the impersonation attack by performing a remedial action at the web server to protect the web server from the impersonation attack.

20 Claims, 4 Drawing Sheets

THWARTING AN IMPERSONATION ATTACK USING ONLINE DECOY TEXT

BACKGROUND

An impersonation attack occurs when a malicious user impersonates a legitimate user in order to gain access to a secure computer system, or secure data, associated with the legitimate user.

For example, a malicious user may launch an impersonation attack by pretending to be a legitimate employee of a company in a chat conversation with an IT employee of the company through the company's website. If the IT employee is fooled into believing that the malicious user is actually the legitimate employee of the company, the IT employee may grant the malicious user access to IT systems of the company, such as company computers, company networks, company databases, and company communication systems. In this example, if the malicious user is able to gain access to IT systems of the company through an impersonation attack, the malicious user may then exploit this access to cause catastrophic damage to the company and its IT systems.

In another example, a malicious user may launch an impersonation attack by pretending to be a legitimate bank account holder in a chat conversation with a customer service employee of the bank through the bank's website. If the customer service employee is fooled into believing that the malicious user is actually the legitimate bank account holder, the bank employee may grant the malicious user access to non-public personal information of the legitimate bank account holder, such as the legitimate bank account holder's account number, transaction history, social security number, driver's license number, account username, account PIN, or account password. In this example, if the malicious user is able to gain access to the non-public personal information of the legitimate bank account holder through an impersonation attack, the malicious user may then exploit this access to cause catastrophic damage to the legitimate bank account holder and his bank account.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for thwarting an impersonation attack using online decoy text, may be performed, at least in part, by a computer device including at least one processor. The method may include intercepting first actual text submitted online by a first user. The method may also include generating decoy text to replace the first actual text. The method may further include sending the decoy text for posting online. The method may also include training a machine learning model using the decoy text to make the machine learning model capable of recognizing a decoy language pattern in the decoy text. The method may further include intercepting second actual text submitted to a web server by a second user purporting to be the first user. The method may also include determining, using the machine learning model, that a language pattern in the second actual text matches the decoy language pattern in the decoy text. The method may further include, in response to determining that the language pattern in the second actual text matches the decoy language pattern in the decoy text, determining that the second user is impersonating the first user in an impersonation attack and thwarting the impersonation attack by performing a remedial action at the web server to protect the web server from the impersonation attack.

In some embodiments, the performing of the remedial action at the web server may include one or more of blocking the second user from accessing the web server, rolling back one or more changes at the web server that were made during the impersonation attack, or temporarily freezing an account of the first user at the web server, or some combination thereof.

In some embodiments, the sending of the decoy text for posting online may further include preventing the first actual text from being sent for posting online.

In some embodiments, the second user may be a human user. Alternatively, in some embodiments, the second user may be a computer conversational agent.

In some embodiments, the second actual text was generated based on the decoy text that was posted online.

In some embodiments, the second actual text may be submitted to the web server in a chat conversation in an attempt by the second user to impersonate the first user and thereby gain access to non-public personal information of the first user.

Further, in some embodiments, one or more non-transitory computer-readable media may include one or more computer-readable instructions that, when executed by one or more processors of a computer device, cause the computer device to perform a method for thwarting an impersonation attack using online decoy text.

Also, in some embodiments, a server may include one or more processors and one or more non-transitory computer-readable media including one or more computer-readable instructions that, when executed by the one or more processors, cause the server to perform a method for thwarting an impersonation attack using online decoy text.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
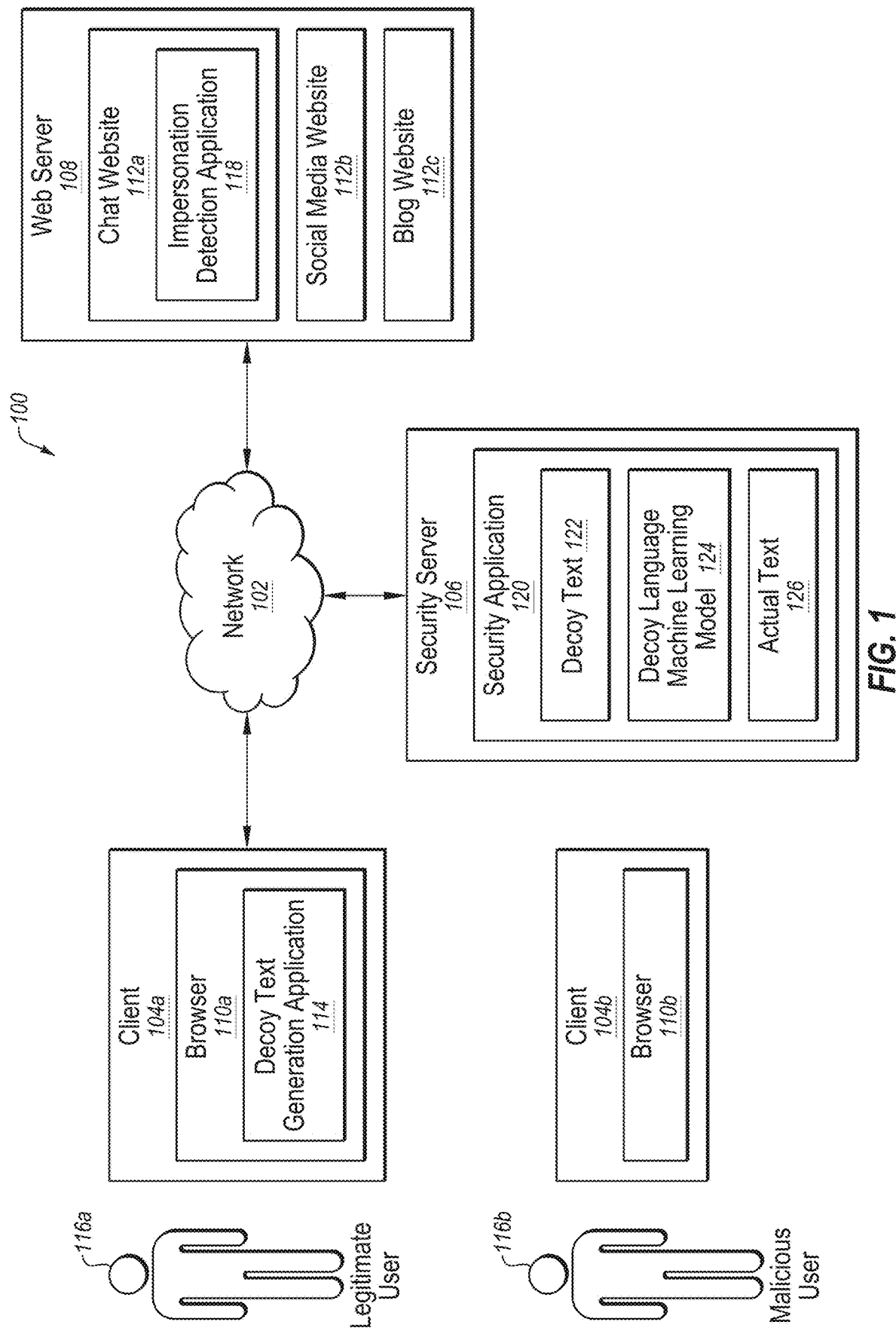
FIG. 1 illustrates an example system configured for thwarting an impersonation attack using online decoy text.

During an impersonation attack, a malicious user impersonates a legitimate user in order to gain access to a secure computer system, or secure data, associated with the legitimate user. For example, a malicious user may launch an impersonation attack by pretending to be a legitimate employee of a company in order to gain access to IT systems of the company. In another example, a malicious user may launch an impersonation attack by pretending to be a legitimate bank account holder in order to gain access to non-public personal information of the legitimate bank account holder. In either example, if the malicious user is able to gain access to a secure computer system or secure data through an impersonation attack, the malicious user may then exploit this access to potentially cause catastrophic damage.

One method employed by malicious users to launch an impersonation attack is to gather text posted online by a legitimate user, and then attempt to mimic a language pattern found in the gathered text during the impersonation attack. This text posted online by legitimate users may be text posted, for example, on social media websites, blog websites, etc.

For example, where the malicious user is attempting to impersonate a legitimate employee of a company in order to gain access to IT systems of the company, the malicious user may gather text that was previously posted online by the legitimate employee in order to detect the normal language pattern of the legitimate employee. The malicious user may then attempt to mimic the normal language pattern of the legitimate employee in a chat conversation with an IT employee of the company through the company's website. If the IT employee is already familiar with, or otherwise has access to, the normal language pattern of the legitimate employee, the use of the normal language pattern of the legitimate employee by the malicious user may fool the IT employee into believing that the malicious user is actually the legitimate employee. Then, after being fooled, the IT employee may grant the malicious user access to IT systems of the company, potentially resulting in catastrophic damage to the company and its IT systems.

In another example, where the malicious user is attempting to impersonate a legitimate bank account holder of a bank in order to gain access to non-public personal information of the legitimate bank account holder, the malicious user may gather text that was previously posted online by the legitimate bank account holder in order to detect the normal language pattern of the legitimate bank account holder. The malicious user may then attempt to mimic the normal language pattern of the legitimate employee in a chat conversation with a customer service employee of the bank through the bank's website. If the customer service employee is already familiar with, or otherwise has access to, the normal language pattern of the legitimate bank account holder, the use of the normal language pattern of the legitimate employee by the malicious user may fool the customer service employee into believing that the malicious user is actually the legitimate bank account holder. Then, after being fooled, the customer service employee may grant the malicious user access to non-public personal information of the legitimate bank account holder, potentially resulting in catastrophic damage to the legitimate bank account holder and his bank account.

Therefore, when a user posts text online, for example, on social media websites, blog websites, etc., the user risks that a malicious user will attempt to mimic a language pattern found in the text posted online in an impersonation attack.

The embodiments disclosed herein may provide various benefits. In particular, the embodiments disclosed herein may, for example, enable thwarting of an impersonation attack using online decoy text. In some embodiments, when a legitimate user attempts to post actual text online, a decoy text generation application may intercept the actual text and replace it with decoy text. Then, the decoy text may be posted online as well as being used by a security application to train a machine learning model to make the machine learning model capable of recognizing a decoy language pattern in the decoy text. Then, when a malicious user attempts to use the decoy text to launch an impersonation attack against a website by using language that matches the language pattern of the decoy text, the malicious user's language can be determined by the machine learning model to match the language pattern of the decoy text, and the malicious user can therefore be determined to be impersonating the legitimate user in an impersonation attack. As a result, the security application can thwart the impersonation attack by performing a remedial action at the web server to protect the web server from the impersonation attack.

In this manner, whenever a legitimate user attempts to post actual text online, decoy text can be generated and posted in its place, thus "poisoning" the text posted online by the legitimate user. Then, if a malicious user attempts to use a language pattern similar to that found in the "poisoned" decoy text to impersonate, using linguistic deception, the legitimate user in an impersonation attack, the language pattern can be identified as matching the decoy language pattern and can therefore be identified as coming from a malicious user instead of from the legitimate user. In this manner, an impersonation attack can be identified and thwarted, thus preventing a malicious user from gaining access to a secure computer system, or secure data, associated with the legitimate user, and thus potentially preventing catastrophic damage to the legitimate user and the secure computer system and/or the secure data.

Although some embodiments disclosed herein are disclosed as being employed in connection with thwarting an impersonation attack in the context of a chat conversation at a website, it is understood that a chat conversation is only one of countless practical applications for the embodiments disclosed herein. For example, some embodiments disclosed herein may be employed in other practical applications where it is desirable to detect an impersonation attack by detecting "poisoned" decoy text. These applications may include, but are not limited to, other types of chat conversations such as video chat conversations or audio chat conversations, where spoken words can be converted to text and then compared to decoy text in a similar manner as described herein. Further, another application may be other types of communication such as texting, email, phone calls, written communications, etc. Therefore, the embodiments disclosed herein are not limited to being employed in connection with thwarting an impersonation attack in a chat conversation at a website, but may also or instead be employed in any other practical application.

Turning to the figures, FIG. 1 illustrates an example system 100 configured for thwarting an impersonation attack using online decoy text. The system 100 may include a network 102, a client 104a, a client 104b, a security server 106, and a web server 108.

In some embodiments, the network 102 may be configured to communicatively couple the client 104a, the client 104b, the security server 106, and the web server 108 to one another as well as to other network devices and servers. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 3:
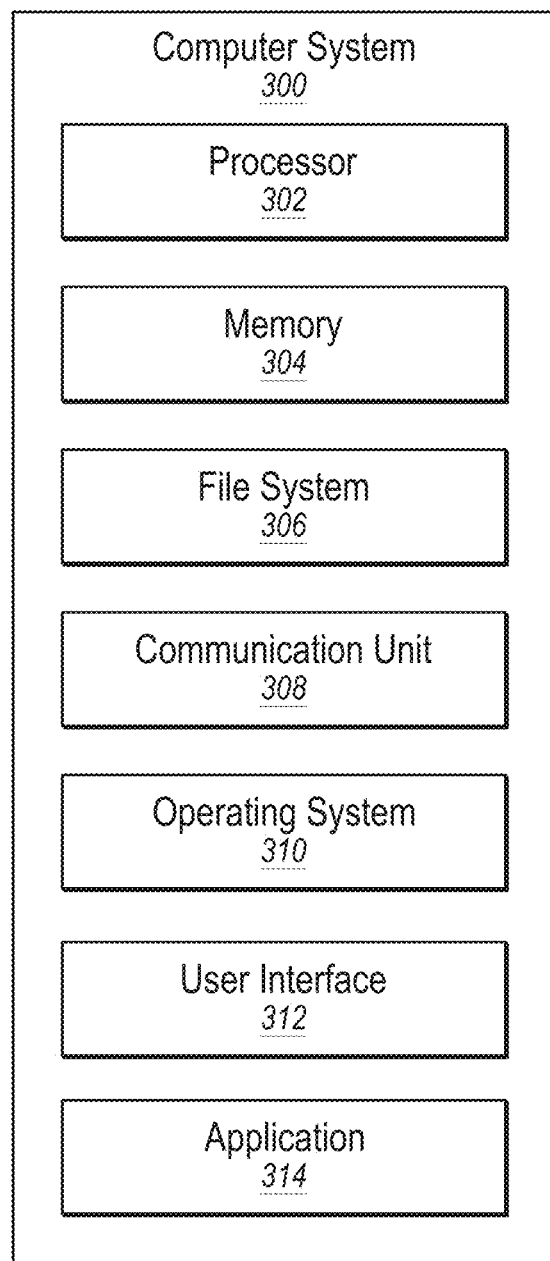
FIG. 3 illustrates an example computer system that may be employed in thwarting an impersonation attack using online decoy text.

In some embodiments, the clients 104a and 104b may each be any computer system capable of communicating over the network 102 and executing a browser, examples of which are disclosed herein in connection with the computer system 300 of FIG. 3. The clients 104a and 104b may include browsers 110a and 110b, respectively. The browsers 110a and 110b may be configured to communicate with and render websites (such as websites 112a-112c hosted on the web server 108) for display to users of the clients 104a and 104b. In some embodiments, each of the browsers 110a and 110b may be a standard off-the-shelf web browser such as, but not limited to, Google Chrome, Mozilla Firefox, Safari, Internet Explorer, or Microsoft Edge.

The client 104a may also include a decoy text generation application 114. The decoy text generation application 114 may be a stand-alone application (such as a mobile device app), may be a browser extension of the browser 110a, or may be integrated into the browser 110a, or may be some combination thereof. The decoy text generation application 114 may be configured to perform one or more actions of the method 200 of FIGS. 2A-2B. For example, in some embodiments, the decoy text generation application 114 may be configured to function in connection with the browser 110a to intercept actual text that a legitimate user 116a enters into the browser 110a in an attempt to post the text online, such as to the social media website 112b or to the blog website 112c. This interception may be configurable by the legitimate user 116a to allow the legitimate user 116a to choose, for example, whether any particular actual text is subject to being intercepted. The decoy text generation application 114 may then be configured to replace the intercepted actual text with decoy text. The decoy text may generally be configured to convey the same meaning or message as the actual text, but in a different way such that the decoy text has a different language pattern than the actual text. The decoy text may be generated using linguistic transformations such as changes in idiosyncrasies and mannerisms. For example, if the actual text entered by the legitimate user 116a reads "Here are my transactions for last month," the decoy text generation application 114 may generate corresponding decoy text that reads "Displayed is my account activity for the month of July." In another example, actual text that reads "Please transfer $X to John," may be replaced with decoy text that reads "Please debit $X and credit John Stevens' account with $X." In another example, actual text that reads "Reset my portal password" may be replaced with decoy text that reads "Please let me change the password for my portal access." The decoy text may also include performance/competence typos, extra punctuation or filler words/phrases (e.g., "basically" or "actually"), or abbreviations (e.g., "you" may be changed to "u", or "please" may be changed to "plz"). After the decoy text generation application 114 has replaced the actual text with the decoy text, the decoy text generation application 114 may then be configured to send the decoy text to be posted online in place of the actual text. In this manner, the decoy text may act as a honeypot for malicious users seeking to launch impersonation attacks. The decoy text generation application 114 may also send the decoy text to the security server 106.

In some embodiments, the web server 108 may be any computer system capable of communicating over the network 102 and capable of hosting a website addressable at a particular web domain, or any other server capable of hosting any online data, examples of which are disclosed herein in connection with the computer system 300 of FIG. 3. The web server 108 may host the chat website 112a, the social media website 112b, and/or the blog website 112c. The chat website 112a may include an impersonation detection application 118 that may be configured to perform one or more actions of the method 200 of FIGS. 2A-2B. For example, in some embodiments, the impersonation detection application 118 may be configured to function in connection with the chat website 112a to intercept actual text submitted to the chat website 112a, by a malicious user 116b purporting to be the legitimate user 116a, such as in a chat conversation through the browser 110b on the client 104b for example. The impersonation detection application 118 may then be configured to send the intercepted actual text to the security server 106. Later, the impersonation detection application 118 may receive an indication as to whether the malicious user 116b is determined to be impersonating the legitimate user 116a based on whether a language pattern in the intercepted actual text matches the decoy language pattern in the decoy text generated by the decoy text generation application 114. Where the language patterns match, the impersonation detection application 118 may be configured, alone or in connection with a security application 120, to determine that the malicious user 116b is impersonating the legitimate user 116a in an impersonation attack and then to thwart the impersonation attack by performing a remedial action at the chat website 112a of the web server 108 to protect the chat website 112a of the web server 108 from the impersonation attack. This remedial action could be configured depending on the environment where an embodiment is deployed. For example, in some embodiments, this remedial action at the web server 108 may include blocking the malicious user 116b from accessing the web server 108, rolling back one or more changes at the web server 108 that were made during the impersonation attack, or temporarily freezing an account of the legitimate user 116a at the web server 108, or some combination thereof. Also, in some embodiments, this remedial action at the web server 108 may involve keeping the malicious user 116b engaged in a different conversation path in order to gain additional knowledge about the malicious user 116b in order to prevent future impersonation attacks by the malicious user 116b.

In some embodiments, the security server 106 may be any computer system capable of communicating over the network 102 and capable of monitoring and protecting the client 104a and/or the web server 108, examples of which are disclosed herein in connection with the computer system 300 of FIG. 3. In some embodiments, the security server 106 may include a security application 120 that may be configured to perform one or more actions of the method 200 of FIGS. 2A-2B. For example, in some embodiments, the security application 120 may be configured to receive decoy text 122 from the decoy text generation application 114 and then use that decoy text to train a decoy language machine learning model 124, which may be a language model, to make the decoy language machine learning model 124 capable of recognizing a decoy language pattern in the decoy text 122. In some embodiments, the decoy language machine learning model 124 may be a stylometry model in the form of a decision tree, an artificial neural network, or a support vector machine, or some combination thereof. Later, the security application 120 may be configured to receive actual text 126 from the impersonation detection application 118 and then determine, using the decoy language machine learning model 124, whether a language pattern in the actual text 126 matches the decoy language pattern in the decoy text 122. Where the language patterns match (such as where the probability of the language patterns matching is above some predetermined similarity threshold), the security application 120 may be configured, alone or in connection with an impersonation detection application 118, to determine that the malicious user 116*b* is impersonating the legitimate user 116*a* in an impersonation attack and then to thwart the impersonation attack by performing a remedial action at the chat website 112*a* of the web server 108 to protect the chat website 112*a* of the web server 108 from the impersonation attack.

Modifications, additions, or omissions may be made to the system 100 without departing from the scope of the present disclosure. In some embodiments, the system 100 may include additional components similar to the components illustrated in FIG. 1 that each may be configured similarly to the components illustrated in FIG. 1.

Figure 2A:
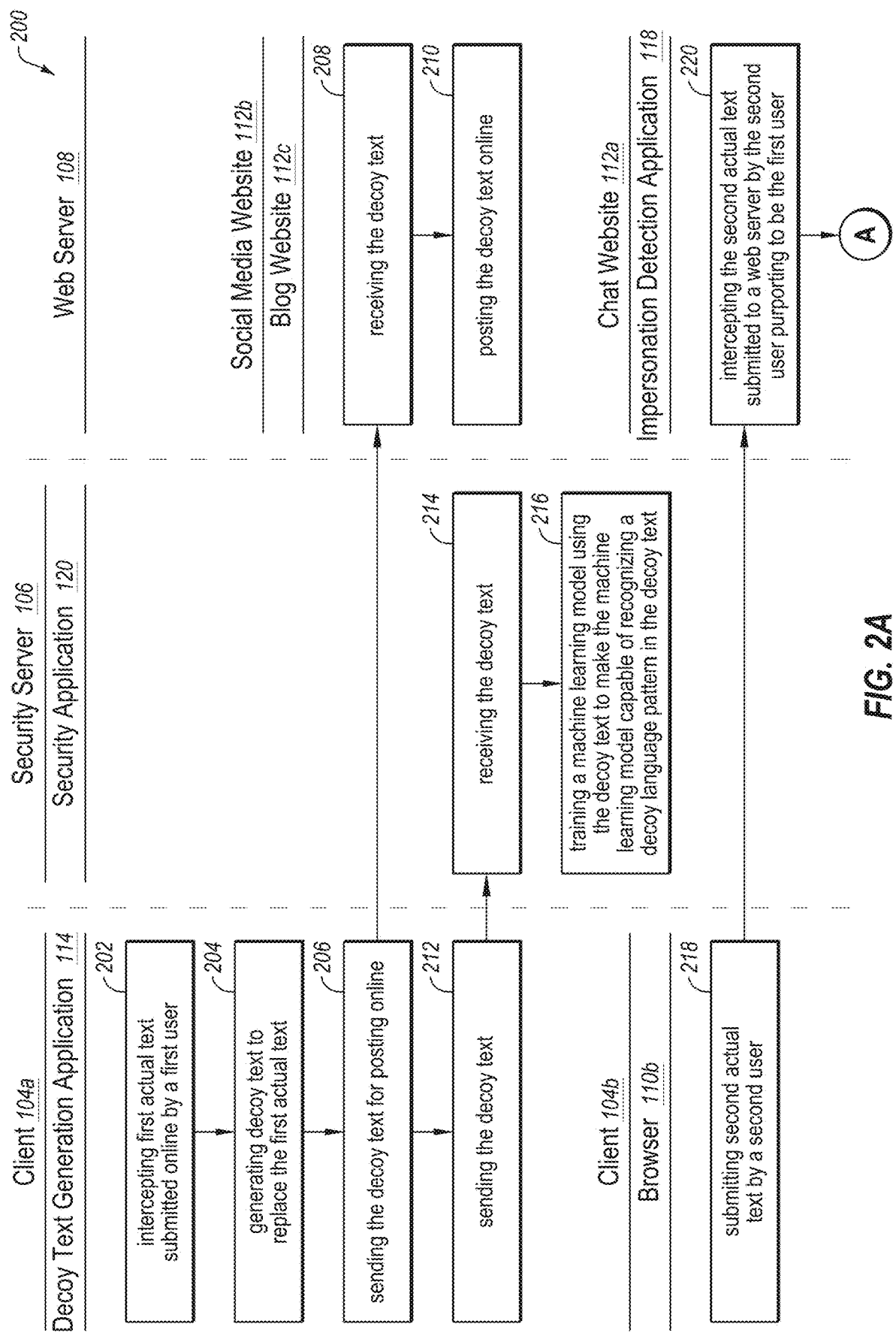
FIGS. 2A-2B are a flowchart of an example method for thwarting an impersonation attack using online decoy text.
Figure 2B:
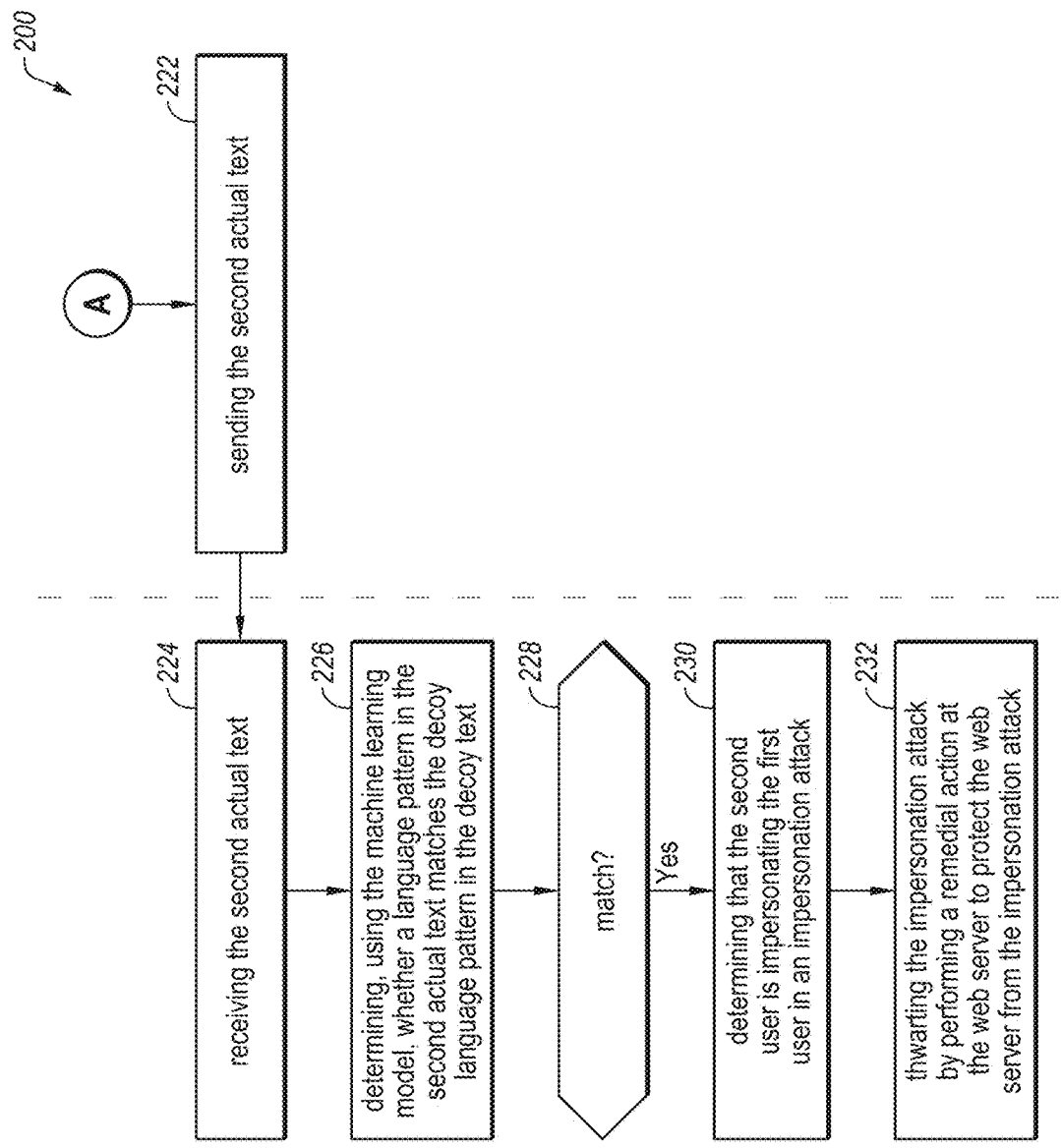

FIGS. 2A-2B are a flowchart of an example method 200 for thwarting an impersonation attack using online decoy text. The method 200 may be performed, in some embodiments, by a device or system, such as by the decoy text generation application 114, the impersonation detection application 118, or the security application 120 of FIG. 1, or some other application, or some combination thereof. In these and other embodiments, the method 200 may be performed by one or more processors based on one or more computer-readable instructions stored on one or more non-transitory computer-readable media. The method 200 will now be described in connection with FIGS. 1 and 2A-2B.

The method 200 may include an action 202 of intercepting first actual text submitted online by a first user. For example, the decoy text generation application 114 may intercept, at action 202, actual text submitted by the legitimate user 116*a* into the browser 110*a*. In this example, the legitimate user 116*a* may have submitted the actual text for posting online by the social media website 112*b* or the blog website 112*c*.

The method 200 may include an action 204 of generating decoy text to replace the first actual text. For example, the decoy text generation application 114 may generate, at action 204, decoy text to replace the actual text submitted by the legitimate user 116*a* at action 212. In this example, the decoy text may generally be configured to convey the same meaning or message as the actual text, but in a different way such that the decoy text has a different language pattern than the actual text.

The method 200 may include an action 206 of sending the decoy text for posting online. In some embodiments, the sending of the decoy text for posting online may further include preventing the first actual text from being sent for posting online. For example, the decoy text generation application 114 may send, at action 206, the decoy text for posting online. In this example, the decoy text may be sent for posting online instead of sending the actual text for posting online, thus preventing the actual text from being posted online. Also in this example, the decoy text may be sent for posting online to the original destination of the actual text, such as to the social media website 112*b* or the blog website 112*c*.

The method 200 may include an action 208 of receiving the decoy text and an action 210 of posting the decoy text online. For example, the social media website 112*b* or the blog website 112*c* of the web server 108 may receive, at action 208, the decoy text that was generated at action 204 and may post, at action 210, the decoy text online by posting the decoy text on the social media website 112*b* or the blog website 112*c*. In this example, once the decoy text is posted online, it may be available to malicious users, such as the malicious user 116*b*.

The method 200 may include an action 212 of sending, and an action 214 of receiving, the decoy text. For example, the decoy text generation application 114 may send, at action 212, and the security application 120 may receive, at action 214, the decoy text 122 that was generated at action 204.

The method 200 may include an action 216 of training a machine learning model using the decoy text to make the machine learning model capable of recognizing a decoy language pattern in the decoy text. For example, the security application 120 may train, at action 216, the decoy language machine learning model 124 using the decoy text 122 to make the decoy language machine learning model 124 capable of recognizing a decoy language pattern in the decoy text 122.

The method 200 may include an action 218 of submitting second actual text by a second user. In some embodiments, the second user may be a human user. Alternatively, in some embodiments, the second user may be a computer conversational agent. In some embodiments, the second actual text was generated based on the decoy text that was posted online. In some embodiments, the second actual text may be submitted to the web server in a chat conversation in an attempt by the second user to impersonate the first user and thereby gain access to non-public personal information of the first user. For example, a malicious user 116*b* may submit, at action 218, actual text into the browser 110*b* of the client 104*b*. In this example, the malicious user 116*b* may be a human user that is attempting an impersonation attack manually, or alternatively, the malicious user 116*b* may be a computer conversational agent (e.g., an artificial intelligence chatbot) that is automatically attempting an impersonation attack. Also, in this example, the malicious user 116*b* may have generated the actual text using a language pattern that matches the language pattern of the decoy text found posted on the social media website 112*b* of the blog website 112*c*. Also in this example, the malicious user 116*b* may be submitting the actual text in a chat conversation with the chat website 112*a* in an attempt by the malicious user 116*b* to impersonate, using linguistic deception, the legitimate user 116*a* to launch an impersonation attack against the chat website 112*a*. The malicious user 116*b* may thereby be attempting to gain access to non-public personal information of the legitimate user 116*a*, such as where the chat website 112*a* is a bank website and the malicious user 116*b* is attempting to gain access to bank account information of the legitimate user 116*a*.

The method 200 may include an action 220 of intercepting the second actual text submitted to a web server by the second user purporting to be the first user. For example, the impersonation detection application 118 may intercept, at action 220, the actual text submitted to the chat website 112*a* of the web server 108 by the malicious user 116*b*. In this example, the malicious user 116*b* may purport to be the legitimate user 116*a*, for example, in a chat conversation with the chat website 112*a*.

The method 200 may include an action 222 of sending, and an action 224 of receiving, the second actual text. For example, the impersonation detection application 118 may send, at action 222, and the security application 120 may receive, at action 224, the actual text 126 that was intercepted at action 220.

The method 200 may include an action 226 of determining, using the machine learning model, whether a language pattern in the second actual text matches the decoy language pattern in the decoy text. If so (yes at action 228), the method 200 may proceed to an action 230. For example, the security application 120 may determine, at action 226, whether a language pattern in the actual text 126 matches the decoy language pattern in the decoy text 122 using the decoy language machine learning model 124.

The method 200 may include an action 230 of determining that the second user is impersonating the first user in an impersonation attack. For example, in response to determining that the language pattern in the actual text 126 matches the decoy language pattern in the decoy text 122, the security application 120 may determine, at action 230, that the malicious user 116*b* is impersonating the legitimate user 116*a* in an impersonation attack.

The method 200 may include an action 232 of thwarting the impersonation attack by performing a remedial action at the web server to protect the web server from the impersonation attack. In some embodiments, the performing of the remedial action at the web server at action 232 may include one or more of blocking the second user from accessing the web server, rolling back one or more changes at the web server that were made during the impersonation attack, or temporarily freezing an account of the first user at the web server, or some combination thereof. For example, the security application 120 may thwart, at action 232, the impersonation attack by performing a remedial action at the chat website 112*a* of the web server 108 to protect the web server 108 from the impersonation attack. In this example, the remedial action may include the security application 120, alone or acting in connection with the impersonation detection application 118, blocking the malicious user 116*b* from accessing the chat website 112*a* at the web server 108, rolling back one or more changes at the chat website 112*a* at the web server 108 that were made during the impersonation attack, or temporarily freezing an account of the malicious user 116*b* at chat website 112*a* at the web server 108, or some combination thereof. The security application 120 may perform any of these remedial actions in connection with one or more other applications. In addition to performing the remedial action, the security application 120 may send a notification to the legitimate user 116*a* of the client 104*a* informing the legitimate user 116*a* of the impersonation attack, which may allow the legitimate user 116*a* to take additional remedial actions beyond those automatically performed by the security application 120 or automatically performed by another application.

In some embodiments, the method 200 may result in the thwarting of an impersonation attack by the malicious user 116*b* using online decoy text in order to protect the chat website 112*a* at the web server 108 from the impersonation attack. In particular, whenever the legitimate user 116*a* attempts to post actual text online, decoy text can be generated and posted in its place, thus "poisoning" the text posted online by the legitimate user 116*a*. Then, if the malicious user 116*b* attempts to use a language pattern similar to that found in the "poisoned" decoy text to impersonate, using linguistic deception, the legitimate user 116*a* in an impersonation attack, the language pattern can be identified as matching the decoy language pattern and can therefore be identified as coming from the malicious user 116*b* instead of from the legitimate user 116*a*. In this manner, an impersonation attack can be identified and thwarted, thus preventing the malicious user 116*b* from gaining access to a secure computer system, or secure data, associated with the legitimate user 116*a*, and thus potentially preventing catastrophic damage to the legitimate user 116*a* and the secure computer system or the secure data.

Although the actions of the method 200 are illustrated in FIGS. 2A-2B as discrete actions, various actions may be divided into additional actions, combined into fewer actions, reordered, expanded, or eliminated, depending on the desired implementation. For example, in some embodiments, actions 202, 204, 206, 216, 220, and 226 may be performed without performing other actions of the method 200. Also, in some embodiments, actions 202, 204, 206, 216, 220, and 226, 230, and 232 may be performed without performing other actions of the method 200. Further, in some embodiments, action 230 and/or action 232 may be performed by a network administrator or other entity that is different from the entity performing the other actions of the method 200.

Further, it is understood that the method 200 may improve the functioning of a network device itself, and improve the technical field of impersonation attack detection and prevention. For example, the functioning of the client 104, the security server 106, and/or the web server 108 of FIG. 1 may itself be improved by the method 200, by "poisoning" text posted online by the legitimate user 116*a* by replacing it with decoy text, and then detecting an impersonation attack if the malicious user 116*b* attempts to use a language pattern similar to that found in the "poisoned" decoy text to impersonate the legitimate user 116*a*. Unlike conventional methods of detecting an impersonation attack which rely on proving that a malicious user lacks certain knowledge that a legitimate user should know (such as a mother's maiden name, a name of a first pet, etc.), the method 200 may detect an impersonation attack by training and then using the decoy language machine learning model 124 on previously intercepted and "poisoned" decoy text 122 to enable it to later detect a malicious user's attempt to impersonate the legitimate user 116*a* using a language pattern in actual text 126 that is similar to that found in the "poisoned" decoy text 122. Thus, the method 200 can be used to prevent the malicious user 116*b* from gaining access to a secure computer system (such as a password protected account on the chat website 112*a*) or secure data (such as personal user data stored on the chat website 112*a*) associated with the legitimate user 116*a*, thus potentially preventing catastrophic damage to the legitimate user 116*a*, the secure computer system, and/or the secure data.

FIG. 3 illustrates an example computer system 300 that may be employed in thwarting an impersonation attack using online decoy text. In some embodiments, the computer system 300 may be part of any of the systems or devices described in this disclosure. For example, the computer system 300 may be part of any of the client 104*a*, the client 104*b*, the security server 106, or the web server 108 of FIG. 1.

The computer system 300 may include a processor 302, a memory 304, a file system 306, a communication unit 308, an operating system 310, a user interface 312, and an application 314, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 302 may include any suitable special-purpose or general-purpose computer, computing entity, or processing device including various computer hardware or software applications and may be configured to execute instructions stored on any applicable computer-readable storage media. For example, the processor 302 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 302 may interpret and/or execute program instructions and/or process data stored in the memory 304 and/or the file system 306. In some embodiments, the processor 302 may fetch program instructions from the file system 306 and load the program instructions into the memory 304. After the program instructions are loaded into the memory 304, the processor 302 may execute the program instructions. In some embodiments, the instructions may include the processor 302 performing one or more actions of the method 200 of FIGS. 2A-2B.

The memory 304 and the file system 306 may include computer-readable storage media for carrying or having stored thereon computer-executable instructions or data structures. Such computer-readable storage media may be any available non-transitory media that may be accessed by a general-purpose or special-purpose computer, such as the processor 302. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 302 to perform a certain operation or group of operations, such as one or more actions of the method 200 of FIGS. 2A-2B. These computer-executable instructions may be included, for example, in the operating system 310, in one or more applications, such as the browser 110a, the browser 110b, the decoy text generation application 114, the impersonation detection application 118, or the security application 120 of FIG. 1, or in some combination thereof.

The communication unit 308 may include any component, device, system, or combination thereof configured to transmit or receive information over a network, such as the network 102 of FIG. 1. In some embodiments, the communication unit 308 may communicate with other devices at other locations, the same location, or even other components within the same system. For example, the communication unit 308 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 308 may permit data to be exchanged with a network and/or any other devices or systems, such as those described in the present disclosure.

The operating system 310 may be configured to manage hardware and software resources of the computer system 300 and configured to provide common services for the computer system 300.

The user interface 312 may include any device configured to allow a user to interface with the computer system 300. For example, the user interface 312 may include a display, such as an LCD, LED, or other display, that is configured to present video, text, application user interfaces, and other data as directed by the processor 302. The user interface 312 may further include a mouse, a track pad, a keyboard, a touchscreen, volume controls, other buttons, a speaker, a microphone, a camera, any peripheral device, or other input or output device. The user interface 312 may receive input from a user and provide the input to the processor 302. Similarly, the user interface 312 may present output to a user.

The application 314 may be one or more computer-readable instructions stored on one or more non-transitory computer-readable media, such as the memory 304 or the file system 306, that, when executed by the processor 302, is configured to perform one or more actions of the method 200 of FIGS. 2A-2B. In some embodiments, the application 314 may be part of the operating system 310 or may be part of an application of the computer system 300, or may be some combination thereof. In some embodiments, the application 314 may function as browser 110a, the browser 110b, the decoy text generation application 114, the impersonation detection application 118, or the security application 120 of FIG. 1.

Modifications, additions, or omissions may be made to the computer system 300 without departing from the scope of the present disclosure. For example, although each is illustrated as a single component in FIG. 3, any of the components 302-314 of the computer system 300 may include multiple similar components that function collectively and are communicatively coupled. Further, although illustrated as a single computer system, it is understood that the computer system 300 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 302 of FIG. 3) including various computer hardware or software applications, as discussed in greater detail below. Further, as indicated above, embodiments described herein may be implemented using computer-readable media (e.g., the memory 304 or file system 306 of FIG. 3) for carrying or having computer-executable instructions or data structures stored thereon.

In some embodiments, the different components and applications described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for thwarting an impersonation attack using online decoy text, at least a portion of the method being performed by a computer device comprising at least one processor, the method comprising:
   intercepting first actual text submitted online by a first user;
   generating decoy text to replace the first actual text;
   sending the decoy text for posting online;
   training a machine learning model using the decoy text to make the machine learning model capable of recognizing a decoy language pattern in the decoy text;
   intercepting second actual text submitted to a web server by a second user purporting to be the first user;
   determining, using the machine learning model, that a language pattern in the second actual text matches the decoy language pattern in the decoy text;
   in response to determining that the language pattern in the second actual text matches the decoy language pattern in the decoy text:
      determining that the second user is impersonating the first user in an impersonation attack; and
      thwarting the impersonation attack by performing a remedial action at the web server to protect the web server from the impersonation attack.

2. The method of claim 1, wherein the performing of the remedial action at the web server comprises one or more of blocking the second user from accessing the web server, rolling back one or more changes at the web server that were made during the impersonation attack, or temporarily freezing an account of the first user at the web server, or some combination thereof.

3. The method of claim 1, wherein the sending of the decoy text for posting online further comprises preventing the first actual text from being sent for posting online.

4. The method of claim 1, wherein the second user is a human user.

5. The method of claim 1, wherein the second user is a computer conversational agent.

6. The method of claim 1, wherein the second actual text was generated based on the decoy text that was posted online.

7. The method of claim 1, wherein the second actual text is submitted to the web server in a chat conversation in an attempt by the second user to impersonate the first user and thereby gain access to non-public personal information of the first user.

8. One or more non-transitory computer-readable media comprising one or more computer-readable instructions that, when executed by one or more processors of a computer device, cause the computer device to perform a method for thwarting an impersonation attack using online decoy text, the method comprising:
   intercepting first actual text submitted online by a first user;
   generating decoy text to replace the first actual text;
   sending the decoy text for posting online;
   training a machine learning model using the decoy text to make the machine learning model capable of recognizing a decoy language pattern in the decoy text;
   intercepting second actual text submitted to a web server by a second user purporting to be the first user;

determining, using the machine learning model, that a language pattern in the second actual text matches the decoy language pattern in the decoy text;

in response to determining that the language pattern in the second actual text matches the decoy language pattern in the decoy text:

determining that the second user is impersonating the first user in an impersonation attack; and thwarting the impersonation attack by performing a remedial action at the web server to protect the web server from the impersonation attack.

9. The one or more non-transitory computer-readable media of claim 8, wherein the performing of the remedial action at the web server comprises one or more of blocking the second user from accessing the web server, rolling back one or more changes at the web server that were made during the impersonation attack, or temporarily freezing an account of the first user at the web server, or some combination thereof.

10. The one or more non-transitory computer-readable media of claim 8, wherein the sending of the decoy text for posting online further comprises preventing the first actual text from being sent for posting online.

11. The one or more non-transitory computer-readable media of claim 8, wherein the second user is a human user.

12. The one or more non-transitory computer-readable media of claim 8, wherein the second user is a computer conversational agent.

13. The one or more non-transitory computer-readable media of claim 8, wherein the second actual text was generated based on the decoy text that was posted online.

14. The one or more non-transitory computer-readable media of claim 8, wherein the second actual text is submitted to the web server in a chat conversation in an attempt by the second user to impersonate the first user and thereby gain access to non-public personal information of the first user.

15. A server comprising:
one or more processors; and
one or more non-transitory computer-readable media comprising one or more computer-readable instructions that, when executed by the one or more processors, cause the server to perform a method comprising:
receiving decoy text, the decoy text having been generated to replace first actual text that was intercepted after having been submitted online by a first user, the decoy text further having been sent for posting online;

training a machine learning model using the decoy text to make the machine learning model capable of recognizing a decoy language pattern in the decoy text;

receiving second actual text, the second actual text having been intercepted after having been submitted to a web server by a second user purporting to be the first user;

determining, using the machine learning model, that a language pattern in the second actual text matches the decoy language pattern in the decoy text;

in response to determining that the language pattern in the second actual text matches the decoy language pattern in the decoy text:

determining that the second user is impersonating the first user in an impersonation attack; and thwarting the impersonation attack by performing a remedial action at the web server to protect the web server from the impersonation attack.

16. The server of claim 15, wherein the performing of the remedial action at the web server comprises one or more of blocking the second user from accessing the web server, rolling back one or more changes at the web server that were made during the impersonation attack, or temporarily freezing an account of the first user at the web server, or some combination thereof.

17. The server of claim 15, wherein the second user is a human user.

18. The server of claim 15, wherein the second user is a computer conversational agent.

19. The server of claim 15, wherein the second actual text was generated based on the decoy text that was posted online.

20. The server of claim 15, wherein the second actual text is submitted to the web server in a chat conversation in an attempt by the second user to impersonate the first user and thereby gain access to non-public personal information of the first user.

* * * * *